3,098,056
PROCESS FOR THE PRODUCTION OF HARDENED, POLYCARBONATE-MODIFIED EPOXY RESIN BODIES
Hermann Schnell, Krefeld-Uerdingen, and Heinrich Krimm, Krefeld-Bockum, Germany, assignors to Farbenfabriken Bayer Aktiengesellschaft, Leverkusen, Germany, a corporation of Germany
No Drawing. Filed Mar. 6, 1961, Ser. No. 93,313
Claims priority, application Germany Mar. 8, 1960
9 Claims. (Cl. 260—42)

The present invention is concerned with a process for the production of hardened, ester-modified epoxy resin bodies.

It is known to harden glycidyl polyethers, as well as other compounds containing at least two epoxy groups in the molecule, to give non-melting and insoluble plastics, lacquers or binding agents, by the use of dicarboxylic acid anhydrides or other catalysts, such as polyamines, alkali-metal compounds or Friedel-Crafts catalysts. Furthermore, it is known to modify glycidyl polyethers before hardening by mixing or reacting them with saturated polyesters of di- or polycarboxylic acids. In such case, polyesters are preferably used that have terminal carboxyl groups which are capable of reacting with the epoxide groups. Furthermore, a commercial method for the production of high molecular weight glycidyl polyethers consists in reacting low molecular weight glycidyl polyethers with dibasic phenols at high temperatures.

The object of the present invention is to provide a process for the production of new, hardened, ester-modified epoxy resin bodies. The process consists in converting mixtures of epoxy resins that have at least two epoxide groups in the molecule, soluble linear polycarbonates of at least dihydric organic hydroxy compounds that have free terminal hydroxy groups, and hardeners into an insoluble and non-melting condition by heat during thermosetting molding operations.

This process can, if desired, be modified in that the epoxy resin having at least two epoxide groups in the molecule and the soluble linear polycarbonates of at least dihydric organic hydroxy compounds having free terminal hydroxyl groups are reacted with one another by heating before the hardener is added and the product thus obtained is finally hardened by the addition of a hardener and heating.

Thus, according to the present invention, a compound which contains at least two epoxy groups in the molecule can be melted with, for example, a low molecular weight polycarbonate of a di- or polyhydric phenol having phenolic terminal hydroxyl groups or, if desired, they can be reacted together at elevated temperatures of, for example, about 100–200° C. After the addition of a conventional hardener for epoxy resins, preferably a dicarboxylic acid anhydride, the mixture or the reaction product from the two starting materials is hardened, while moulding, at temperatures of about 100° C. up to about 220° C.

That such a process would lead to valuable synthetic materials possessing favorable properties was not to be expected. According to previous experience with polycarbonates, it was to be expected that, for example, dicarboxylic acid anhydrides would react with the terminal hydroxyl groups of the polycarbonates with the formation of carboxyl terminal groups. However, as is known, these liberate carbonate dioxide from polycarbonates at elevated temperatures by an interesterification reaction. The development of carbon dioxide during the hardening would, however, nullify the technical utility of the hardened products due to the formation of bubbles. However, the products hardened with dicarboxylic acid anhydrides proved to be clear, bubble-free, homogeneous bodies with outstanding mechanical and electrical properties. On the other hand, as is known, basic materials, particularly at elevated temperatures, have a marked decomposing effect on polycarbonates, so that hardening with the use of basic hardeners would not lead one to expect good results.

In another respect also the result of the process according to the invention is surprising. It is known that the polycarbonates from, for example, dihydroxy-diaryl-alkanes, are exceptionally tough and elastic plastic materials in a high molecular condition. Low molecular weight polycarbonates of aromatic dihydroxy compounds, and also of the dihydroxy-diaryl-alkanes, as are preferably used as starting material for the present process, are, on the other hand, non-elastic, hard resins which splinter like glass. Therefore, in the case of the combination of epoxy resins with low molecular weight polycarbonates of this type, a cracking of the hardened products was to be expected. However, the products of the process are characterized by high elasticity, toughness and solidity.

Due to the particular feature of the process of starting from separately produced materials, there is obtained an exceptionally wide breadth of variation for the production of duroplastic materials with different properties. Thus, for example, bifunctional phenols can be used for the production of the polycarbonates and these can be hardened with bifunctional epoxy compounds to give very elastic products with high tensile strength. However, tri- and polyfunctional phenols or aliphatic di- or polyhydroxy compounds could also serve for the production of soluble low to high molecular weight polycarbonates and these can be worked up with tri- and poly-functional epoxides to give very highly cross-linked formed bodies with a high degree of thermal resistivity (Marten's degree). Furthermore, the desired properties of the hardened bodies can be adjusted in any desired manner, for example, with regard to the degree of cross-linking and of the elasticity, by varying the quantity ratio of carbonates to epoxy compounds. Finally, the properties of the end products can be modified in any desired manner by the choice of suitable identical or different di- or polyhydroxy compounds or di- or polyepoxides.

A further noteworthy advantage of the present process is that it renders possible the production of products which, in contradistinction to the known epoxy resins based on dihydroxy-diaryl-alkanes and epichlorohydrin, contain a minimum of aliphatic hydroxyl groups. This is made possible because the carbonate group is used as an important constructional element for the formation of the cross-linked structure whereas, in the case of the known epoxy resins, as a rule, the 2-hydroxypropylene residue with a free alcoholic hydroxyl group serves as a bridging member between the dihydroxy-diaryl-alkane residues. However, as is known, the ability to absorb water is thereby increased and the electrical properties of the products are unfavorably influenced.

The low to high molecular weight polycarbonates can be produced in known manner, for example, by the reaction of di- or polyhydroxy compounds, preferably phenols, with diesters of carbonic acid, for example, diethyl or diphenyl carbonate, or with phosgene. In this manner, as is known, the average molecular size and the nature of the end groups can be determined by the ratio of the reaction components to one another. Thus, for example, one obtains by the reaction of 2 mols of a dihydroxy compound with 1 mol of a carbonic acid derivative, mainly a low molecular weight mono-carbonate; by the use of 3 mols of a dihydroxy compound and 2 mols of a carbonic acid derivative, mainly a low molecular weight dicarbonate, and so forth. In the case of using more than bifunctional phenols, the ratio of the reaction components must be so chosen that the polycarbonates are meltable. For the process according to the invention, polycarbonates of the mentioned type which contain in the molecule an average of about 3 to about 30 residues of di- or polyhydroxy compounds, are particularly suitable.

Amongst the di- and polyhydroxy compounds suitable for the production of such polycarbonates, there may be mentioned, by way of example, ethylene glycol, diethylene glycol, polyethylene glycols, butane-1,4-diol, pentane-1,5-diol, hexane-1,6-diol, glycerol, trimethylolethane, trimethylolpropane, and trimethylolbutane, pentaerythritol, bis- and tris(hydroxyalkyl) aromatic di- and trihydroxy compounds, quinitol (1,4-cyclohexanediol), bis(hydroxycyclohexyl)alkanes, pyrocatechol, resorcinol, hydroquinone, pyrogallol, phloroglucinol, dihydroxydiphenyls, dihydroxynaphthalenes, bis-(hydroxyphenyl)-alkanes, -ethers, -sulphides, -sulphones and -sulphoxides, di- and tetrachloro- and bromo-bis-(hydroxyphenyl)-alkanes, 2,5,3'-trihydroxy-diphenyl ethers, 1,1,1-(4,4', 4''-trihydroxytriphenyl)-ethane and 2,2-(2,4,4'-trihydroxy-diphenyl)-propane. Furthermore, mixtures of such aliphatic, cycloaliphatic and aromatic di- and polyhydroxy compounds can be used for the production of the carbonates or polycarbonates. Amongst the compounds which contain at least two epoxide groups in the molecule, there may be mentioned, in particular, the reaction products of aromatic dihydroxy compounds, such as dihydroxy-diaryl-alkanes or other aromatic dihydroxy compounds of the above-mentioned type, particularly 2,2-(4,4'-dihydroxy-diphenyl)-propane, (which is also known as 2,2-bis(4-hydroxyphenyl)propane and bisphenol A) with epichlorohydrin. Particular preference is to be given to the low molecular weight products of this type with an average molecular weight of up to about 2000. Low molecular weight and soluble reaction products of the above-mentioned tri-functional phenols with epichlorohydrin can also be used with great advantage.

Further, the diglycidyl or polyglycidyl ethers of aliphatic or cycloaliphatic di- or poly-alcohols, such as can easily be produced, for example, by the reaction of ethylene glycol, ethylene diglycol, glycerol, trimethylolpropane or 2,2 - (4,4' - dihydroxydicyclohexyl) - propane with epichlorohydrin in the presence of sodium hydroxide or in the presence of boron trifluoride with subsequent splitting off of hydrogen chloride, are suitable for the process. Finally, there may also be mentioned the reaction products of amines, for example, reaction products of ethylamine, ethylene diamine, cyclohexylamine and aniline with epichlorohydrin, insofar as they possess at least two epoxide groups in the molecule.

Instead of or as well as these starting materials, generally known as epoxy resins or epoxy resin precursors, the di- or poly-epoxides of olefins, such as butadiene dioxide, vinyl cyclohexane dioxide and 2,2-(dicyclohexenyl)-propane dioxide, as well as compounds which, besides the reactive epoxide groups, also possess other inert groups, such as diglycidyl ethers or diglycidyl esters of adipic acid or phthalic acid, can also be used as suitable precursors.

As hardeners there may be used not only the usual basic catalysts such as high boiling amines, for instance, tributylamine, dimethylcyclohexylamine, benzidine, and N-methyldecahydroquinoline, low molecular weight polyamines of dimerized fatty acids, alkali-metal compounds, for instance, alkali-metal oxides, hydroxides, and carbonates, salts of aliphatic and aromatic carboxylic acids, alcoholates, phenolates and amides, or Friedel-Crafts catalysts such as zinc chloride, iron chloride, aluminum chloride, boron fluoride, tin tetrachloride, titanium tetrachloride, sulphur trioxide, sulphuric acid and benzene and toluene sulfonic acids but especially the anhydrides of dicarboxylic acids, such as phthalic anhydride, tetrachlorophthalic anhydride, tetrahydrophthalic anhydride, hexahydrophthalic anhydride, maleic anhydride and 1,4,5,6,7,7 - hexachlorobicyclo[2.2.1]-5 - heptene-2,3-dicarboxylic anhydride, which is known as chlorendic anhydride.

As already mentioned above, the quantity ratio of the three starting components for the new epoxy resins can be varied within wide limits.

The new products are suitable for the production of formed bodies, castings, pressed masses, laminated materials, lacquers, binding agents and adhesives.

Fillers of different kinds, such as pigments, glass powder, asbestos, soot or graphite, as well as plasticizers and dyestuffs, can be incorporated. The incorporation of glass fibres for the purposes of strengthening is also possible.

The following examples are given for the purpose of illustrating the present invention; the parts specified are to be understood to be parts by weight:

*Example 1*

A melt of 228 parts (1 mol) of 2,2-(4,4'-dihydroxydiphenyl)-propane, 143 parts (0.67 mol) of diphenyl carbonate and 0.02 part of the sodium salt of 2,2-(4,4'-dihydroxydiphenyl)-propane is slowly heated in an atmosphere of nitrogen in vacuo, commencing at 140° C. internal temperature and 100 mm. Hg up to 240° C. while the pressure is reduced stepwise to 12 mm. Hg. After the splitting off of the theoretical amount of phenol (126 parts), the transesterification is finished. A hard resin having an average molecular weight of 708 (calculated 736) and a hydroxyl number of 148 (calculated 152) is obtained.

49 parts of this resin are homogeneously melted with 28 parts of a glycidyl polyether having an epoxide number of 7.8 percent, corresponding to an epoxide value of 0.49 (produced from 2,2-(4,4'-dihydroxydiphenyl)-propane and epichlorohydrin in the presence of powdered sodium hydroxide) and 0.3 part of the sodium salt of 2,2-(4,4'-dihydroxydiphenyl)-propane and hardened at 160° C. After three hours, a clear, non-melting resin with good mechanical properties is obtained.

*Example 2*

80 parts of the low molecular weight polycarbonate described in Example 1, 20 parts of the glycidyl polyether having an epoxide number of 7.8 percent, 15.6 parts of phthalic anhydride and 0.06 part of tributylamine are melted to a homogeneous mass and hardened at 170° C. within two hours to give a clear non-melting resin.

*Example 3*

50 parts of the polycarbonate described in Example 1 and 70 parts of the glycidyl polyether having an epoxide number of 7.8 percent are melted and quickly stirred until homogeneous with 9.2 parts of molten benzidine. The initial mixture of low viscosity hardens at 120° C. within a few minutes to a hard, non-melting plastic with good mechanical properties.

*Example 4*

In a manner analogous to that described in Example 1, a low molecular weight polycarbonate having an average molecular weight of 1230 (calculated 1244) and a hydroxyl number of 85 (calculated 90) is produced from 5 mols of 2,2-(4,4'-dihydroxydiphenyl)-propane and 4 mols of diphenyl carbonate.

Equal parts of this polycarbonate and of a glycidyl polyether having an epoxide number of 7.2 percent, corresponding to an epoxy value of 0.45 (produced from 2,2-(2,4,4'-trihydroxydiphenyl)-propane and epichlorohydrin in the presence of powdered sodium hydroxide) are melted to a homogeneous mass with 36 percent by weight of phthalic anhydride and 0.05 percent by weight of dimethyl cyclohexylamine and hardened at 150° C. within about three hours to a tough, elastic highly cross-linked plastic.

Example 5

Equal parts of the low molecular weight polycarbonate described in Example 1 and of a glycidyl polyether having an epoxide number of 6.2 percent, corresponding to an epoxide value of 0.39 (produced from 2,2-(4,4'-dihydroxydiphenyl)-propane and epichlorohydrin) are homogeneously melted at temperatures of up to 160° C. 32 parts of molten phthalic anhydride and 0.1 part of dimethylcyclohexylamine are stirred into 100 parts of this mixture. The resin hardens within three hours at 150° C. in an open mould to a tough, elastic formed body.

Example 6

Equal parts of a low molecular weight polycarbonate (average molecular weight 1720), produced in a manner analogous to that described in Example 1 by the transesterification of diphenyl carbonate with 2,2-(4,4'-dihydroxydiphenyl)-propane (mol ratio 6:7), and of a glycidyl polyether having an epoxide number of 6.2 percent, corresponding to an epoxy value of 0.39 and produced from 2,2-(4,4'-dihydroxy diphenyl)-propane and epichlorohydrin, are homogeneously melted at temperatures of up to 160° C. 36 parts of molten phthalic anhydride and 0.1 part of dimethylcyclohexylamine are stirred into 100 parts of this mixture. The resin hardens within three hours at 150° C. in an open mould to a tough, elastic formed body.

Example 7

Equal parts of the low molecular weight polycarbonate described in Example 6 and of 2,2-(dicyclohexenyl)-propane dioxide are homogeneously melted at temperatures of up to 160° C. 69 parts of molten phthalic anhydride and 0.1 part of dimethylcyclohexylamine are stirred into 100 parts of this mixture. The resin hardens within three hours at 150° C. in an open mould to a highly cross-linked, tough, formed body.

Example 8

Equal parts of a polycarbonate produced by the transesterification of diphenyl carbonate with 1,1,1-(4,4',4''-trihydroxytriphenyl)-ethane (mol ratio 3:5), and of a glycidyl polyether having an epoxide number of 6.2 percent, corresponding to an epoxy value of 0.39, produced from 2,2-(4,4'-dihydroxydiphenyl)-propane and epichlorohydrin, are homogeneously melted at temperatures of up to 160° C. 36 parts of molten phthalic anhydride and 0.1 part of dimethylcyclohexylamine are stirred into 100 parts of this mixture. The resin hardens within three hours at 150° C. in an open mould to a hard, tough formed body.

Example 9

Equal parts of the low molecular weight polycarbonate described in Example 6 and of a glycidyl polyether produced from 2,2-(4,4'-dihydroxydiphenyl)-propane and epichlorohydrin, having an epoxide number of 7.8 percent, are heated for half an hour at 80° C. The epoxide number of the reaction product then lies at 2.6 percent. 100 parts of this resin are then hardened within twenty hours at 120° C. in an open mould with 27 parts of phthalic anhydride and 0.05 part of N-methyl-decahydroquinoline. A tough, elastic plastic is obtained.

Example 10

A melt of 428 parts (2 mols) of diphenyl carbonate, 354 parts (3 mols) of 1,6-hexanediol and 0.01 part of powdered sodium hydroxide is slowly heated in vacuo from 150° C. to 250° C., while the pressure is reduced stepwise from 100 to 10 mm. Hg. The transesterification is finished as soon as the theoretical amount of phenol (376 parts) has distilled off. The soft resin thus obtained crystallizes upon cooling. It has an average molecular weight of 402 and a hydroxyl number of 272.

Equal parts of this resin and of a glycidyl polyether having an epoxide number of 7.8 percent (produced from 2,2-(4,4'-dihydroxydiphenyl)-propane and epichlorohydrin) are melted together with 36 percent by weight of phthalic anhydride and, after the addition of 0.06 percent by weight of dimethylcyclohexylamine, hardened at 120° C. within twenty hours. A plastic of great toughness is obtained which at room temperature is stiff but at temperatures above 50° C. is, nevertheless, characterized by its rubbery elasticity and great toughness.

We claim:

1. A process for the production of a hardened ester-modified epoxy resinous solid, which comprises heating together at a temperature between 100 and 220° C., while molding the same, a mixture of
    (a) an epoxy resin having at least two epoxy groups in its molecule,
    (b) a meltable linear polycarbonate of an organic polyhydroxy compound having at least two free terminal hydroxyl radicals, and
    (c) a hardener of the group consisting of high-boiling amines, alkali-metal compounds, catalysts of the Friedel-Crafts type, sulfur trioxide, sulfuric acid, aromatic sulfonic acids, and anhydrides of organic dicarboxylic acids for a period sufficient to convert the mixture into an essentially insoluble and infusible solid.

2. A process as defined in claim 1 in which the epoxy resin is first reacted with the linear polycarbonate by heating at a temperature between 100 and 200° C. before being mixed with the hardener.

3. A process as defined in claim 1, in which the polycarbonate contains an average between about 3 and about 30 residues of polyhydroxy compounds.

4. A process as defined in claim 1 in which the epoxy resin has an average molecular weight of up to about 2000.

5. A process as defined in claim 1 in which the hardener is an anhydride of an organic dicarboxylic acid.

6. A process as defined in claim 1 in which the epoxy resin is a resin produced from 2,2-bis(4-hydroxyphenyl)-propane and epichlorohydrin.

7. A process as defined in claim 1 in which the polycarbonate is a polycarbonate of 2,2-bis(4-hydroxyphenyl)-propane.

8. A process as defined in claim 1 in which the hardener is phthalic anhydride.

9. A formed body prepared from a hardened ester-modified epoxy resin body as defined in claim 1.

No references cited.